United States Patent
Sun et al.

(10) Patent No.: US 9,539,997 B2
(45) Date of Patent: Jan. 10, 2017

(54) METHOD OF POWER SPLIT FOR HYBRID POWERTRAIN

(71) Applicant: Cummins Inc., Columbus, IN (US)

(72) Inventors: Zhen Sun, Columbus, IN (US); Morgan MacKenzie Andreae, Columbus, IN (US); Martin T. Books, Columbus, IN (US)

(73) Assignee: Cummins Inc., Columbus, IN (US)

( * ) Notice: Subject to any disclaimer, the term of this patent is extended or adjusted under 35 U.S.C. 154(b) by 126 days.

(21) Appl. No.: 14/446,043

(22) Filed: Jul. 29, 2014

(65) Prior Publication Data

US 2016/0031428 A1 Feb. 4, 2016

(51) Int. Cl.
| | |
|---|---|
| *B60W 20/10* | (2016.01) |
| *B60W 20/00* | (2016.01) |
| *B60W 10/06* | (2006.01) |
| *B60W 10/08* | (2006.01) |
| *B60W 10/26* | (2006.01) |
| *B60W 30/188* | (2012.01) |

(52) U.S. Cl.
CPC .............. *B60W 20/10* (2013.01); *B60W 10/06* (2013.01); *B60W 10/08* (2013.01); *B60W 10/26* (2013.01); *B60W 20/11* (2016.01); *B60W 20/13* (2016.01); *B60W 30/1882* (2013.01); *B60W 2510/244* (2013.01); *B60W 2540/10* (2013.01); *B60W 2710/0605* (2013.01); *B60W 2710/0644* (2013.01); *B60W 2710/0677* (2013.01); *B60W 2710/086* (2013.01); *Y02T 10/6286* (2013.01); *Y10S 903/93* (2013.01)

(58) Field of Classification Search
CPC ...... B60W 20/10; B60W 10/08; B60W 10/06; B60W 2710/0666; B60W 2710/083; B60W 2710/086; B60W 2710/0644; B60W 2710/081; B60W 2710/0677; B60W 20/00; B60W 20/11; B60W 20/12; B60W 20/13; B60W 20/14; Y10S 903/93

See application file for complete search history.

(56) References Cited

U.S. PATENT DOCUMENTS

| | | |
|---|---|---|
| 4,407,132 A | 10/1983 | Kawakatsu et al. |
| 5,788,004 A | 8/1998 | Friedmann et al. |
| 5,789,882 A | 8/1998 | Ibaraki et al. |
| 6,186,255 B1 | 2/2001 | Shimasaki et al. |
| 6,847,189 B2 | 1/2005 | Frank |

(Continued)

*Primary Examiner* — Helal A Algahaim
*Assistant Examiner* — Genna Mott
(74) *Attorney, Agent, or Firm* — Taft, Stettinius & Hollister LLP

(57) ABSTRACT

A system and method are disclosed for controlling a power split in a hybrid powertrain having an engine and a motor. According to at least one aspect of the present disclosure, the method includes selecting a displaced fuel consumption value for the engine based on a quantity of available reclaimed energy in a battery, where the displaced fuel consumption value favors using the quantity of available reclaimed energy at relatively high load conditions, operating the engine at a condition based on the displaced fuel consumption value to generate engine power to meet at least a portion of a power demand, and operating the motor to generate motor power sufficient to supply a remaining power demand not met by the engine power. The system includes a controller configured to perform the operations of the method.

20 Claims, 6 Drawing Sheets

(56) References Cited

U.S. PATENT DOCUMENTS

| | | |
|---|---|---|
| 7,017,348 B2 | 3/2006 | Tajima et al. |
| 7,104,347 B2 | 9/2006 | Severinsky et al. |
| 7,237,634 B2 | 7/2007 | Severinsky et al. |
| 7,844,375 B2 | 11/2010 | Hung et al. |
| 2005/0274553 A1* | 12/2005 | Salman .................... B60K 6/52 180/65.28 |
| 2009/0259363 A1 | 10/2009 | Li et al. |
| 2011/0166735 A1* | 7/2011 | Kustosch ................. B60K 6/48 701/22 |
| 2014/0081500 A1* | 3/2014 | Ito .......................... B60K 6/445 701/22 |

\* cited by examiner

METHOD OF POWER SPLIT FOR HYBRID POWERTRAIN

TECHNICAL FIELD

The present disclosure generally relates to control methods for hybrid powertrains.

BACKGROUND

Hybrid powertrains utilize more than one power source to generate the torque and power needed to meet the demands of the application in which the hybrid powertrain is employed. A hybrid powertrain may include a first power source (e.g., an internal combustion engine) and a second power source (e.g., an electric motor/generator and associated battery pack). The powertrain further generally includes interfacing hardware, electronic controllers, linking networks, power electronics, an engine compartment, a vehicle body, a transmission, etc. To supply power effectively, a hybrid powertrain system requires a determination of the total torque and/or power requirement for the powered application, a determination of the contributions from the available power sources that will be provided to meet the total torque and/or power requirement, and finally control of the individual power sources to meet the determined individual contributions.

Controlling the contributions of the available power sources is complex and depends upon the application and demanded duty cycle of the hybrid powertrain. Common control schemes involve comparing efficiency of the internal combustion engine and efficiency of the electric motor/generator. Other methods include attempting to convert an electrical power quantity to an equivalent fuel quantity or to some other sort of cost function. Fundamentally, these methods employ efficiency maps of the internal combustion engine and the electric motor/generator. However, such efficiency maps can yield less than optimal results because each predicts low efficiency at low power levels. Accordingly, there remains a need for further contributions in this area of technology.

SUMMARY

A system and method are disclosed for controlling a power split in a hybrid powertrain having an engine and a motor. According to at least one aspect of the present disclosure, the method includes selecting a displaced fuel consumption value for the engine based on a quantity of available reclaimed energy in a battery, where the displaced fuel consumption value favors using the quantity of available reclaimed energy at relatively high load conditions, operating the engine at a condition based on the displaced fuel consumption value to generate engine power to meet at least a portion of a power demand, and operating the motor to generate motor power sufficient to supply a remaining power demand not met by the engine power. The system includes a controller configured to perform the operations of the method.

This summary is provided to introduce a selection of concepts that are further described herein in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like reference numerals refer to like parts throughout the several views, and wherein.

DESCRIPTION OF ILLUSTRATIVE EMBODIMENTS

Figure 1:
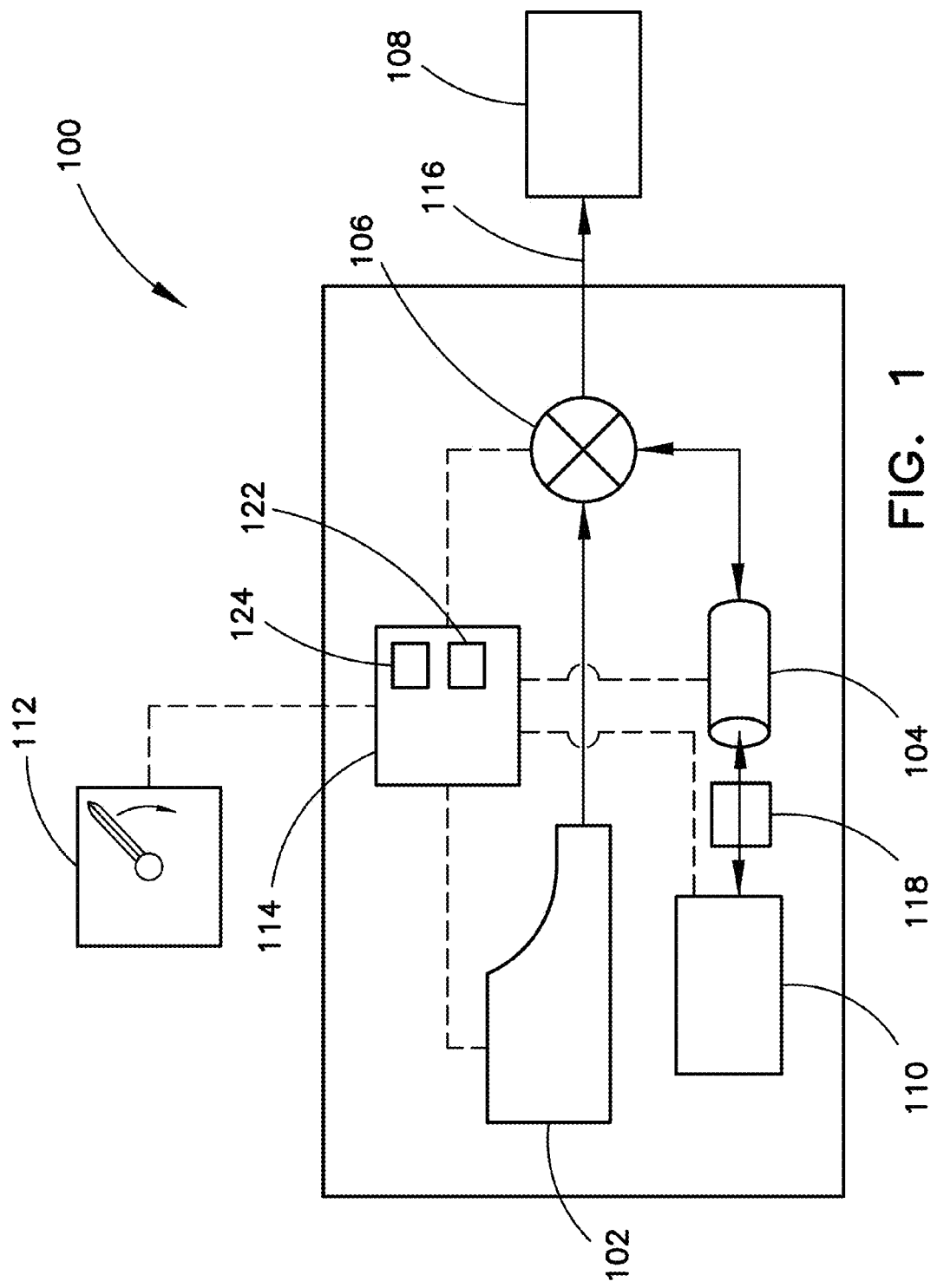
FIG. 1 is a schematic block diagram of an embodiment of a hybrid powertrain according to the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

One aspect of the present disclosure describes strategies for controlling the individual power contributions of power sources employed in a hybrid powertrain, the power sources being an electric motor and an engine. An exemplary control structure for determining a desired split between the available power sources includes monitoring the free reclaimed energy available in a battery over an operating cycle, monitoring the level of charge of the battery, and prioritizing the use of the available free reclaimed energy when possible. The control structure uses a measure of relative engine efficiency, referred to as the displaced fuel consumption, to determine the optimal contribution of engine power for the available motor power. The displaced fuel consumption may be defined as the fuel that can be saved if the engine-contributed power is incrementally decreased and replaced with an incremental increase of electric power provided by the motor via the battery. Displaced fuel consumption is a function of the thermal efficiencies, not the mechanical efficiencies, of the engine, motor, power electronics (e.g., inverters), and battery. Because the engine and motor are coupled, the mechanical losses of the power sources generally are unaffected by an incremental change in the power split and do not affect the displaced fuel consumption. Thus, by using displaced fuel consumption, all mechanical losses are treated as a fixed and unavoidable load that is added to the total load demand on the powertrain and that is not part of the power split determination. Therefore, the mechanical losses are not considered in a power split determination based on the displaced fuel consumption.

Displaced fuel consumption differs from the brake specific fuel consumption ("BSFC"), which is one common measure of the fuel efficiency of an internal combustion engine. The BSFC is the rate of fuel consumption as a measure of the mass of fuel consumed to produce a unit of power and is often given in units of grams per kilowatt-hour (g/kW·h) or pounds per horsepower-hour (lb/hp·h). Conceptually, BSFC represents the amount of heating power from chemical energy input via the fuel divided by the amount of mechanical power output from the engine, which includes both mechanical and thermal losses. An engine will generally demonstrate peak BSFC operating near peak torque with the intake air unthrottled, and the BSFC for a given engine will vary at different operating conditions of speed and load.

However, control schemes that use efficiency maps based on BSFC for an engine, and comparable efficiency maps for an electric motor, can yield less than optimal results because both the engine and motor demonstrate low efficiency at low power levels when analyzed by such measures. For example, at low power levels where the total power input is reduced to a level that rivals the mechanical and electrical losses, the motor/generator efficiency approaches zero, and for the internal combustion engine, the BSFC approaches infinity. For a low total power demand, conventional methods yield poor results in optimal power allocation because each individual efficiency map would suggest the other power source should be utilized. The control structure and system of the present disclosure overcomes these deficiencies by using the displaced fuel consumption to incorporate all mechanical losses from both power sources into the total load demand on the powertrain, thereby removing the mechanical losses from the power split determination. Because the power split determination of the present disclosure analyzes incremental changes in the power contributions of the engine and motor, the displaced fuel consumption at times may be more precisely referred to as the marginal displaced fuel consumption. The marginal displaced fuel consumption may be quantified in grams of fuel per kilowatt-hour of battery electrical power (g/kWh).

According to at least one embodiment of the present disclosure, a hybrid powertrain 100 is shown in FIG. 1. As shown in FIG. 1, the powertrain 100 may include an internal combustion engine 102 coupled with an electrical motor/generator 104 (hereinafter "the motor 104"). The motor 104 may include any device structured to provide a mechanical torque by converting electrical energy and further structured to generate electrical energy from a mechanical torque. Accordingly, the motor 104 may alternately operate as an electric motor when generating mechanical torque and as an electric generator when producing electrical charge from mechanical torque supplied by other aspects of the powertrain 100, including the engine 102. As depicted in FIG. 1, the motor 104 may be a single motor/generator. Alternatively, the motor 104 may be include multiple electrical motors, a separate motor and generator, or any other configuration of electrical torque production understood in the art. The engine 102 may be a compression-ignition engine (e.g., a diesel engine), a spark-ignition engine (e.g., a gasoline or alcohol engine), a multifuel engine, a fuel cell, or any other suitable, non-electrical torque provider. Further, the powertrain 100 may use any suitable combination of power sources, including without limitation internal combustion engines, hydraulic motors or pumps, electric motors, fuel cell devices, or any other power sources.

In the FIG. 1, the powertrain 100 is illustrated in a parallel configuration in which the engine 102, the motor 104, or both may apply torque via a power splitter 106 to a driveline 116 coupled to a load 108. In such an embodiment, the engine 102 and motor 104 apply torque to the same driveline 116 such that their speeds are similar and their torques are additive. Alternatively, the powertrain 100 may be arranged in a series-parallel configuration including more than one power splitter 106. The load 108 may depend on the application of the powertrain 100. By way of non-limiting example, in a vehicular application, the load 108 may include the wheels of a vehicle propelled by the powertrain 100. In a power generation application, the load 108 may be a machine powered by the powertrain 100, such as a pump or drilling rig for instance. In certain embodiments, the powertrain 100 may be configured in any suitable arrangement of suitable power providers.

The driveline 116 may be mechanically coupled to the engine 102 and the motor 104 via the power splitter 106. In the arrangement illustrated in FIG. 1, the power splitter 106 may receive power input from the engine 102 and the motor 104 and further can provide power to the engine 102 or motor 104. The driveline 116 may further be coupled to a battery 110 via the power splitter 106 and motor 104. The battery 110 may be electrically coupled to the motor 104 such that the battery 110 may provide power to or accept power from the motor 104 and, further, may provide power to the driveline 116 via the motor 104 and power splitter 106. For example, the motor 104 may provide electrical power to charge the battery 110, or the battery 110 may provide electrical power to motor 104 to generate mechanical torque to drive the driveline 116 via the power splitter 106. The battery pack 110 may include any suitable electrical storage device, for example and without limitation, a Lithium-ion-type battery, Lithium Phosphate-type battery, a hyper-capacitor, or a fuel cell. In at least one embodiment, the battery 110 may be used to start or re-start the engine 102 during operations. In certain embodiments, the powertrain 100 may include a separate starter motor (not shown) to start or re-start the engine 102. In further embodiments, the powertrain 100 may include a second battery (not shown) to power the starter motor to start or re-start the engine 102.

Though not illustrated in FIG. 1, the powertrain 100 may include components disposed between and connecting the driveline 116 and the load 108. For example, the powertrain 100 may include without limitation an axle gear, a transmission (that in certain embodiments may be included within the power splitter 106), a torque converter, a gear splitter, a differential, a deep reduction gear, and/or any other device known in the art that may be in the torque path between either of the engine 102 and motor 104 and the load 108. Moreover, the powertrain 100 may include power electronics, such as one or more inverters 118 to convert alternating current ("AC") electricity generated by the motor 104 to direct current ("DC") to be stored in the battery 110 and/or to convert DC electricity from the battery 110 to AC electricity to power the motor 104.

The powertrain 100 enables the capture and use of reclaimed free energy from the load 108 and storage of the free reclaimed energy as electrical charge in the battery 110. Free reclaimed energy may include captured kinetic energy from the load 108 that would otherwise be lost. For example, in an application where the powertrain 100 is employed in a vehicle, where the load 108 is the vehicle's wheels on the road, the free reclaimed energy may be the vehicle's kinetic energy dissipated during a braking event. In such an application, the kinetic energy lost as heat in the brake linings during, braking may be reclaimed via the motor 104 to charge the battery 110 while also slowing the vehicle. The capture of kinetic energy usually lost in a braking event is commonly referred to as regenerative braking. Reclaimed free energy may further be captured during coasting events, such as downhill coasting, and shifting. Accordingly, the braking and coasting events, as well as other situations where kinetic energy is captured, may be referred to as regeneration events. The control structure for determining the desired split between available power sources, the motor 104 and engine 102, includes monitoring the free reclaimed energy available in the battery 110 over an operating cycle, monitoring the level of charge of the battery 110, and prioritizing the use of the available free reclaimed energy when possible as described further herein. Thus, in addition to other system requirements, the charge capacity of the battery 110 may be selected, at least in part, to allow capacity for storage and use of an estimated amount of free reclaimed energy generated from an estimated duty cycle of the powertrain 100.

The powertrain 100 may further include a demand input device 112 that provides a torque or power demand to a controller 114. Where the powertrain 100 is employed in a vehicle operated by a driver, the demand input device 112 may be actuated by a driver to signal a torque or power demand. The demand input device 112 may be one or more of any type of suitable torque or power input device. Non-limiting examples of the demand input device 112 include an accelerator pedal providing an electronic or mechanical position indication, a switch arranged to provide a torque or power input demand either as indicated by a switch position or calculated from the switch position over time (e.g., ramped up or down with the switch position), a continuous device to provide a torque or power input demand (e.g., a dial, potentiometer, meter, etc.), and/or a device that provides a feedback representing the torque or power demand (e.g., a device that automatically responds to an engine or vehicle speed to provide a torque or power demand consistent with reducing an offset in the speed from a set point). The powertrain 100 may include multiple demand input devices 112 that may provide torque or power demands sequentially, selectively, and/or in parallel.

The controller 114 may be structured to perform certain operations comprising the control structure to provide power split control for the hybrid powertrain 100. In certain embodiments, the controller 114 forms a portion of a processing subsystem that includes one or more computing devices having memory, processing, and/or communication hardware. The controller 114 may be a single device or a distributed device, and the functions of the controller 114 may be performed by hardware and/or software. The controller 114 can include one or more Arithmetic Logic Units (ALUs), Central Processing Units (CPUs), memories, limiters, conditioners, filters, format converters, or the like which are not shown to preserve clarity. In one form, the controller 114 is of a programmable variety that executes algorithms and processes data in accordance with operating logic that is defined by programming instructions (such as software or firmware). Alternatively or additionally, operating logic for the controller 114 can be at least partially defined by hardwired logic or other hardware. It should be appreciated that controller 114 can be exclusively dedicated to controlling the power split with the powertrain 100 or may further be used in the regulation, control, and activation of one or more other subsystems or aspects of the powertrain 100.

The controller 114 may include one or more modules structured to functionally execute the operations of the controller 114. The description herein including modules emphasizes the structural independence of the aspects of the controller, and illustrates one grouping of operations and responsibilities of the controller. Other groupings that execute similar overall operations are understood to be within the scope of the present application. Modules may be implemented in hardware and/or software on computer readable medium, and modules may be distributed across various hardware or software components.

The controller 114 may include a power split module 124, among others, to determine a desired split between the power contributions of the engine 102 and motor 104 and to provide commands to the engine 102, motor 104, battery 110, and power splitter 106 to effectuate the desired split. The power split module 124 uses the gradient of fuel consumption relative to an incremental change in the power split between the engine 102 and the motor 104 to determine the appropriate power split relative to a requested torque or power from the demand input device 112. In general, the desired power split is that which maximizes the operating efficiency of the powertrain 100 under the present operating conditions, as a whole, but not necessarily the separate power sources individually. Further, the desired power split may vary as the operating conditions of the powertrain 100 change of over its duty cycle.

The efficiency of the motor 104 may be defined as the ratio of mechanical power output to electrical power input. In some embodiments, the efficiency of the motor 104 may also include the efficiency effects of the inverter 118 (i.e., the ratio of electrical AC power output to electrical DC power input). Accounting for the losses that affect output power, the efficiency of the motor 104 may be defined as:

$$\eta_{motor} = \frac{\text{Electrical Power In} - \text{Mechanical Losses} - \text{Thermal Losses}}{\text{Electrical Power In}} \quad \text{(Equation 1)}$$

Likewise, accounting for the losses that affect output power from the engine 102, the BSFC may be defined as:

$$bsfc \approx \frac{\text{Chemical Heating Power In}}{\text{Chemical Heating Power In} - \text{Mechanical Losses} - \text{Thermal Losses}} \quad \text{(Equation 2)}$$

As is apparent from EQs. 1 and 2, at low power levels where the total power input is reduced to a level that rivals the mechanical and electrical losses, the motor efficiency (EQ. 1) approaches zero, and the engine efficiency (EQ. 2) approaches infinity. For a low total power demand, conventional power split methods yield poor results for power allocation because each efficiency equation suggests that the other power source should be utilized under such operating conditions. Because the motor 104 is relatively more efficient at using free reclaimed energy, while the engine 102 is relatively inefficient at burning an incremental amount of additional fuel, conventional methods may tend to err on the side of using the free reclaimed electrical power of the battery 110 via the motor 104 when total power demand is low. However, in a hybrid powertrain system where the motor and engine are both mechanically coupled to the drivetrain, as is the case in a parallel hybrid system when the motor/engine clutch is engaged, most of the mechanical losses associated with each device cannot be avoided by simply porting all power and torque to the alternate power source. In all cases, when the engine 102 and motor 104 are coupled to each other, the mechanical losses of each power source are incurred regardless of each source's contribution to the total power output. Consequently, while EQ. 1 and EQ. 2 may be valid representations for the efficiencies of the engine 102 and motor 104 individually, EQ. 1 and EQ. 2 do not necessarily provide the most efficient power split for a hybrid powertrain for all operating conditions.

In at least one embodiment according to the present disclosure, the power split module 124 of the controller 114 may determine an efficient desired power split between the engine 102 and motor 104 by determining the incremental displaced fuel consumption of the engine 102. Displaced fuel consumption provides a metric of the gradient of fuel consumption relative to an incremental change in the power split. This gradient will tend to favor a power split in which the total thermal losses from the engine 102 and the motor 104 (which may include thermal losses of the inverter 118) are lowest. Incremental effects on the efficiency of the motor 104, inverter 118, and other power electronics components of the system 100 may be taken into account. Generally, the sensitivity of the thermal losses of the engine 102 to the total engine load is greater than the sensitivity of the thermal losses of the motor 104 to total motor load. Moreover, the magnitude of the change in the thermal efficiency of the engine 102 is generally most significant. While the thermal losses from the engine 102 tend be lower at low power, where the engine 102 can operate at a lower temperature, the incremental increase in thermal efficiency of the engine 102 is greater at higher power levels, where the engine 102 is operating at relatively high temperatures. Because the displaced fuel consumption will be maximized at conditions where a decrease in engine-contributed power is accompanied by an increase in thermal efficiency of the engine 102, the displaced fuel consumption generally will be maximized where the engine 102 is operating at relatively high temperatures. Conversely, because the displaced fuel consumption is a function of the thermal efficiencies, the incremental efficiency of the powertrain 100 may be increased when the displaced fuel consumption is maximized.

Figure 2:
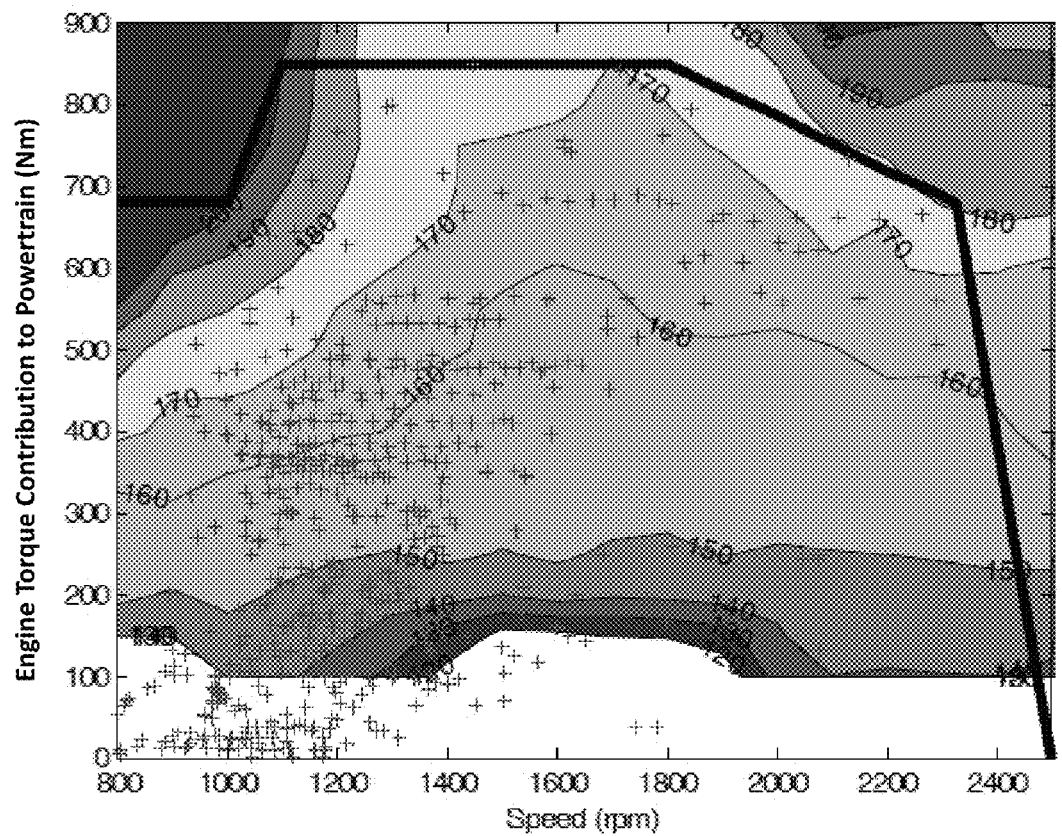
FIG. 2 is a contour plot of marginal displaced fueling rate in grams per kilowatt-hour (g/kWh) over an operating range of an exemplary engine in a hybrid powertrain illustrated as torque, in Newton-meters (N·m), versus engine speed, in revolutions per minutes (rpm), according to the present disclosure.

FIG. 2 shows an example contour plot for an exemplary hybrid powertrain 100 of the incremental displaced fuel consumption over the operating range of the powertrain 100. In FIG. 2, for reference the bold line represents a typical system torque curve, and the crosses indicate specific operating conditions (i.e., speed and torque demand) over a typical duty cycle. Each isometric line defines a region of displaced fuel consumption as labeled on the plot. Accordingly, each isometric line indicates the marginal displaced fuel consumption for the engine 102 given an engine-allocated contribution to the total system torque. In some aspects, FIG. 2 may be conceptualized as an engine efficient map, such as one plotting BSFC over the operating range, with the shared mechanical losses (i.e., the losses shared with the motor 104) removed. For each operating condition there is a maximum displaced fuel consumption, for which a substitution of electrical power saves a maximum quantity of fuel. As FIG. 2 indicates, the displaced fuel consumption is highest over the operating range when the engine 102 is operating near peak torque, where the engine 102 is generally not most thermally efficient. Further, the marginal displaced fuel consumption decreases as the torque contribution of motor 104 increases and displaces a great portion of the torque contribution of the engine 102. Continued substitution of motor power for engine power provides only diminishing returns. That is, the marginal displaced fuel consumption will be greatest for the very first kilowatt-hour of motor power used to offset engine power, and the absolute displaced fuel consumption will be greatest where that kilowatt-hour of motor power is replaced under a high torque condition. Thus, contrary to conventional power split control schemes based on a BSFC efficiency map of the engine 102, analysis of the displaced fuel consumption reveals that at least the incremental thermal efficiencies of the powertrain 100 may be maximized at higher load conditions.

FIG. 2 indicates a control scheme for providing the desired power split between the engine 102 and the motor 104 at a given operating condition to achieve a desired displaced fuel consumption. For example, given a demanded operating condition of the powertrain 100 having a drive speed of 1800 revolutions per minute (rpm) and torque of 800 newton meters (N·m), FIG. 2 indicates that the marginal displaced fuel consumption is about 170 g/kWh. If the power split determination allocates 500 N·m of torque to be provided by the engine 102, leaving 300 N·m to be contributed by the motor 104, the marginal displaced fuel consumption would be reduced to 160 g/kWh for any additional contribution of the motor 104. As the preceding example demonstrates, the desired power contribution of the motor 104 may be determined by selecting a desired marginal displaced fuel consumption contour line, operating the engine 102 at or below the selected contour line, and adjusting the power contribution of the motor 104 to meet the remaining total system power demand.

In at least one embodiment according to the present disclosure, the substitution of motor-contributed power for engine-contributed power directed by the control structure may be constrained by the available free reclaimed energy stored in the battery 110, which is duty cycle dependent. The available free reclaimed energy stored in the battery 110 may limit the power contribution of the motor 104 where the stored available free reclaimed energy is not adequate to meet the total system power demand at the selected displaced fuel consumption. Under such operating conditions, the power contribution of the engine 102 may be increased incrementally to a sustainable level of motor-contributed power that is within the stored available free reclaimed energy of the battery 110.

Supplying electrical charge to the battery 110 using the engine 102 by burning fuel is not desirable because it is relatively inefficient. Thus, in at least one embodiment, the battery 110 is only charged by free reclaimed energy captured by the powertrain 100 over the course of the operating duty cycle. Accordingly, to enable determination of the desired power split and the potential power contribution of the motor 104, the control scheme may monitor the available free reclaimed energy by monitoring the charge state of the battery 100. Further, the charge state of the battery 110 may be monitored to ensure that the battery charge does not drop below a lower limit or rise above an upper limit. The lower and upper limits define a desired charge range, which depends on the specific composition and characteristics of the battery 110. Thus, the control scheme may limit the use of electrical motor power in place of engine power to the desired charge state or charge range of the battery 110. In certain embodiments, the desired charge range may be about 60-80%. In such an embodiment, the control structure may favor using the battery 110 and motor 104 until the charge state drops below the lower limit of around 60%. Below the lower limit, the control structure may favor using engine-contributed power until the charge state exceeds the lower limit. Likewise, as the charge state approaches the upper limit of around 80%, the control structure may favor using the battery 110 and motor 104 to ensure charge capacity is available for additional storage of free reclaimed (i.e., regeneration) energy from a braking or coasting event, for instance. In certain embodiments, the charge capacity of the battery 100 may be selected to enable the storage of the free reclaimed energy generated by the estimated duty cycle of the powertrain 100. The estimated duty cycle includes an estimated period of time the powertrain 100 is operating at specific operating conditions, including the estimated period of time of regeneration events such as braking and coasting periods.

In at least one embodiment according to the present disclosure, the control structure may include two control loops that are controlled simultaneously. A first control loop may monitor and control the battery charge state, including the charge conditions (e.g., voltage, current, rate, etc.), charge level relative to the desired charge range (e.g., 60-80%), and discharge conditions (e.g., voltage, current, rate, etc.). The first control loop may be included in a battery control module 122 included in the controller 114. A second control loop may respond to power demand by determining the desired power split and commanding the corresponding output power from the engine 102 and motor 104. The second control loop may be included in the power split module 124 of the controller 114. The first control loop may constrain the commands of the second control loop, which may further provide feedback to the first control loop. In at least one embodiment, the power split module 124 may use one or more reference tables of displaced fuel consumption values for the engine 102 over the operating range of speed and load. The power split module 124 may use the reference table to look up the target marginal displaced fuel consumption value for a given operating condition. The one or more reference tables need not include every operating condition over the entire operating range of the engine 102. In such embodiments, the controller 114 may interpolate or extrapolate the desired marginal displaced fuel consumption value from the reference table. Alternatively, the desired marginal displaced fuel consumption value may be calculated from relationships among parameters defining the operating conditions of the engine 102, motor 104, and battery 110.

In at least one embodiment including two control loops that are controlled simultaneously, the first control loop may monitor and control the charge state of the battery 110 relative to the desired charge state range (e.g., 60-80%) and prioritize the use free reclaimed energy to ensure storage capacity for the next regeneration event. The second control loop manages the power split of the total demand on the powertrain 100, affected by the battery charge state limits of the first control loop. Within the constraints imposed by the first control loop, the second control loop further exploits the increased marginal displaced fuel consumption that exists at higher loads and selects a power split that more aggressively consumes the available free reclaimed energy from the battery 110 at higher loads, acting qualitatively not by using any explicit displaced fuel consumption tables or related load thresholds. In at least one embodiment, the aggressive use of available free reclaimed energy from the battery 110 at higher loads may be quantified as a multiplier factor to the consumption rate of battery power that varies in proportion to total load on the powertrain 100. For example, in such an embodiment, the power split module 124 may determine and apply a battery consumption factor to the calculation of the torque contribution of the motor 104 where the charge state of the battery 110 is relatively high in its target range, indicating limited storage capacity for the next regeneration event, and demand on the powertrain 100 is relatively high. The consumption factor may be used to quantitatively prioritize the use of battery power instead of engine power under such operating conditions.

By using displaced fuel consumption as a metric for the balance of thermal efficiencies within the powertrain 100 various power split control structures may be implemented. In at least one embodiment according to the present disclosure, the control structure may select a marginal displaced fuel consumption operating condition based on an analysis of the available reclaimed energy over the duty cycle of the powertrain 100. In such an embodiment, the control structure may interpret a power demand for the powertrain 100 via the demand input device 112. In response, the control structure may first determine a projected available reclaimed energy over the estimated duty cycle. The estimated duty cycle may be calculated based on the intended application, such as whether the powertrain 100 is employed in a vehicle and the type of vehicle. Alternatively, the estimated duty cycle may be calculated based on rolling empirical data captured during operation of the subject powertrain 100, such that the estimated duty cycle may be adjusted during operation of the powertrain 100. Given the estimated duty cycle, the projected available reclaimed energy may be determined from the charge capacity of the battery 110 and the anticipated regeneration events such as braking and coasting periods from the estimated duty cycle. Given the projected available reclaimed energy in the battery 110, a sustainable minimum displaced fuel consumption value may be selected, whereby the control structure may command the engine 102 to operate at a speed and load at or near the selected displaced fuel consumption value across the operating range (i.e., along a contour line of FIG. 2). The control structure may further command the motor 104 to provide the remaining power demand not met by the engine 102. The control structure may continuously adjust the power split between the engine 102 and the motor 104 in response to changes in power demand and actual available reclaimed energy.

In at least one alternative embodiment, because the maximum displaced fuel consumption generally occurs at maximum total load as shown in FIG. 2, the control structure may favor the use of free reclaimed energy specifically at high load conditions. In such an embodiment, the control structure first may determine the available reclaimed energy in the battery 110 and set a threshold load condition on the engine 102. The control structure may further interpret a power demand and, in response, may command the engine 102 to supply engine-contributed power to meet the power demand up to the established threshold load condition. If the power demand exceeds the threshold load condition, the control structure may command the motor 104, when the battery 110 has available reclaimed energy stored therein, to provide the remaining power demand not met by the engine-contributed power from engine 102. Further, the control structure may adjust the threshold load condition as needed to maintain available reclaimed energy in the battery 110.

The threshold load condition may be selected based on the projected available reclaimed energy over the estimated duty cycle. The estimated duty cycle may be established based on the intended application, such as whether the powertrain 100 is employed in a vehicle and the type of vehicle. Alternatively, the estimated duty cycle may be based on rolling empirical data captured during operation of the subject powertrain 100, such that the estimated duty cycle may be adjusted during operation of the powertrain 100. Given the estimated duty cycle, the threshold load condition may be set to a prescribed level that favors the use of free reclaimed energy at relatively high load conditions within the estimated duty cycle. Alternatively, the threshold load condition may be selected such that the battery 110 is anticipated to maintain sufficient reclaimed energy to meet the portion of the power demand commanded to the motor 104 over the estimated duty cycle.

In at least one alternative embodiment, because the marginal displaced fuel consumption generally favors using free reclaimed energy from the battery 110 in lieu of engine-contributed power from the engine 102 at high total powertrain load, the control structure may command the motor 104 to supply as much power as possible given the limits of the available reclaimed energy stored in the battery 110. In such an embodiment, the control structure may further command the engine 102 to supply power as needed to meet the power demand not met by the motor 104. The available reclaimed energy may be the current available reclaimed energy or may be established based on the intended application, such as whether the powertrain 100 is employed in a vehicle and the type of vehicle. Alternatively, the estimated duty cycle may be based on rolling empirical data captured during operation of the subject powertrain 100, such that the estimated duty cycle may be adjusted during operation of the powertrain 100. Given the estimated duty cycle, the projected available reclaimed energy may be determined from the charge capacity of the battery 110 and the anticipated regeneration events such as braking and coasting periods from the estimated duty cycle.

The schematic flow descriptions that follow provide illustrative embodiments of methods to determine a desired power split between power sources of a hybrid powertrain. Operations illustrated are understood to be exemplary only, and the operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Figure 3:
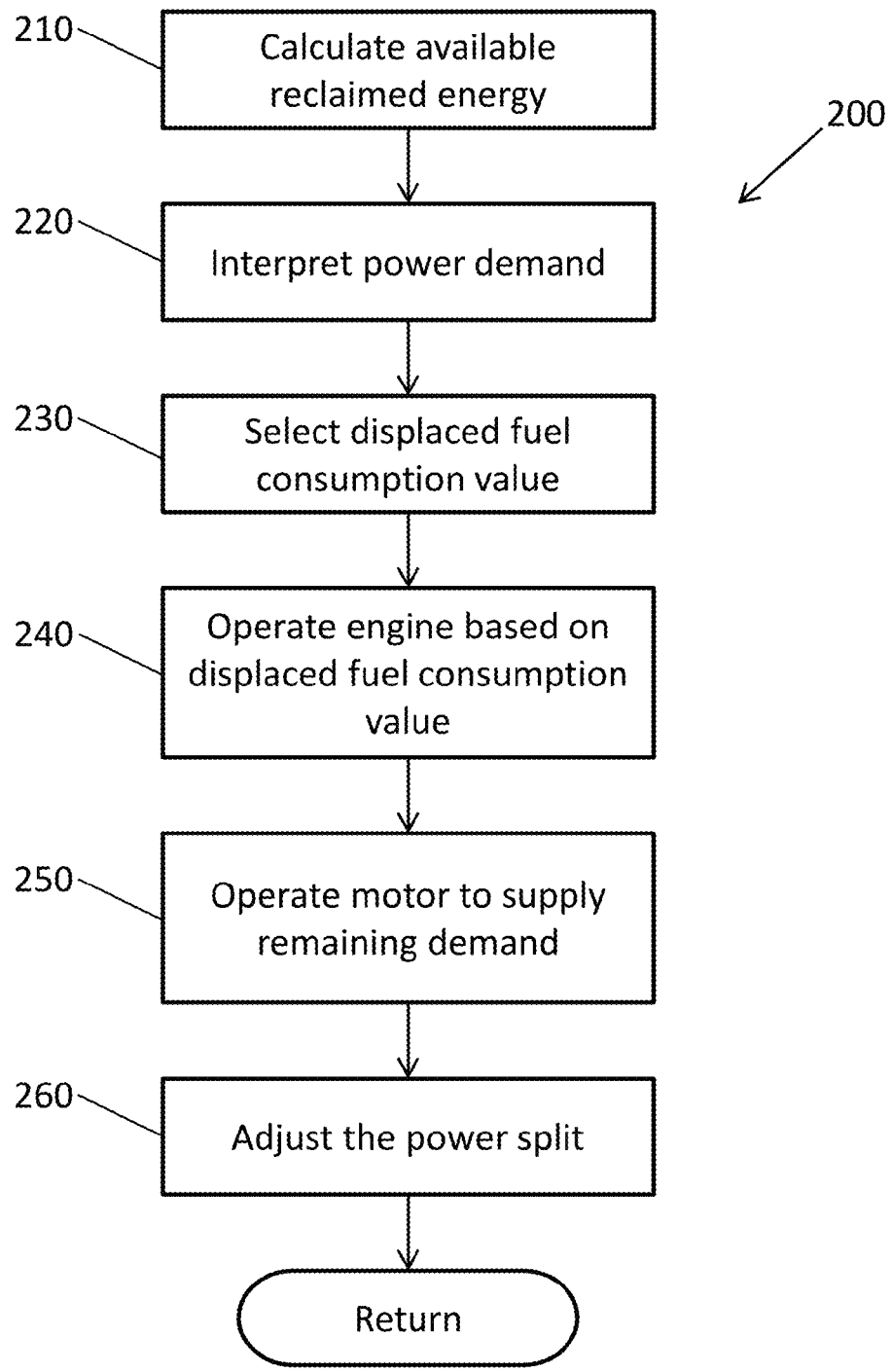
FIG. 3 is a schematic flow diagram of a method for controlling a power split in a hybrid powertrain according to the present disclosure.

As shown in FIG. 3, a method 200 of determining a desired power split between power sources of the hybrid powertrain 100 includes an operation 210 of calculating a quantity of available reclaimed energy in the battery 110 of the hybrid powertrain 100 over the estimated duty cycle of the powertrain 100, The method 200 may include an operation 220 of interpreting the power demand for the powertrain 100 from the demand input device 112, In at least one embodiment, the power demand may be interpreted as a torque demand. The method 200 may further include an operation 230 of selecting a displaced fuel consumption value, whereby the selection is based on the quantity of available reclaimed energy in the battery 110. The operation 230 may include selecting the displaced fuel consumption value for the engine 102 to enable the battery 110 to supply electrical power to the motor 104 over the estimated duty cycle, such that a charge state of the battery 110 does not drop below a prescribed lower limit nor rise above a prescribed upper limit and such that the displaced fuel consumption value favors using the quantity of available reclaimed energy at relatively high load conditions. The method 200 may include an operation 240 of operating the engine 102 at a speed and load condition based on the displaced fuel consumption value to generate engine power to meet at least a portion of the power demand. The method 200 may further include an operation 250 of operating the motor 104 to supply the remaining power demand not met by the engine 102 operating at the displaced fuel consumption value. The method 200 may further include an operation 260 of adjusting the commanded power split between the engine 102 and the motor 104 in response to changes in power demand. Moreover, operation 260 may include adjusting the commanded power split between the engine 102 and the motor 104 in response to changes in the available reclaimed energy, such as when the charge state of the battery 110 approaches the prescribed lower limit.

Figure 4:
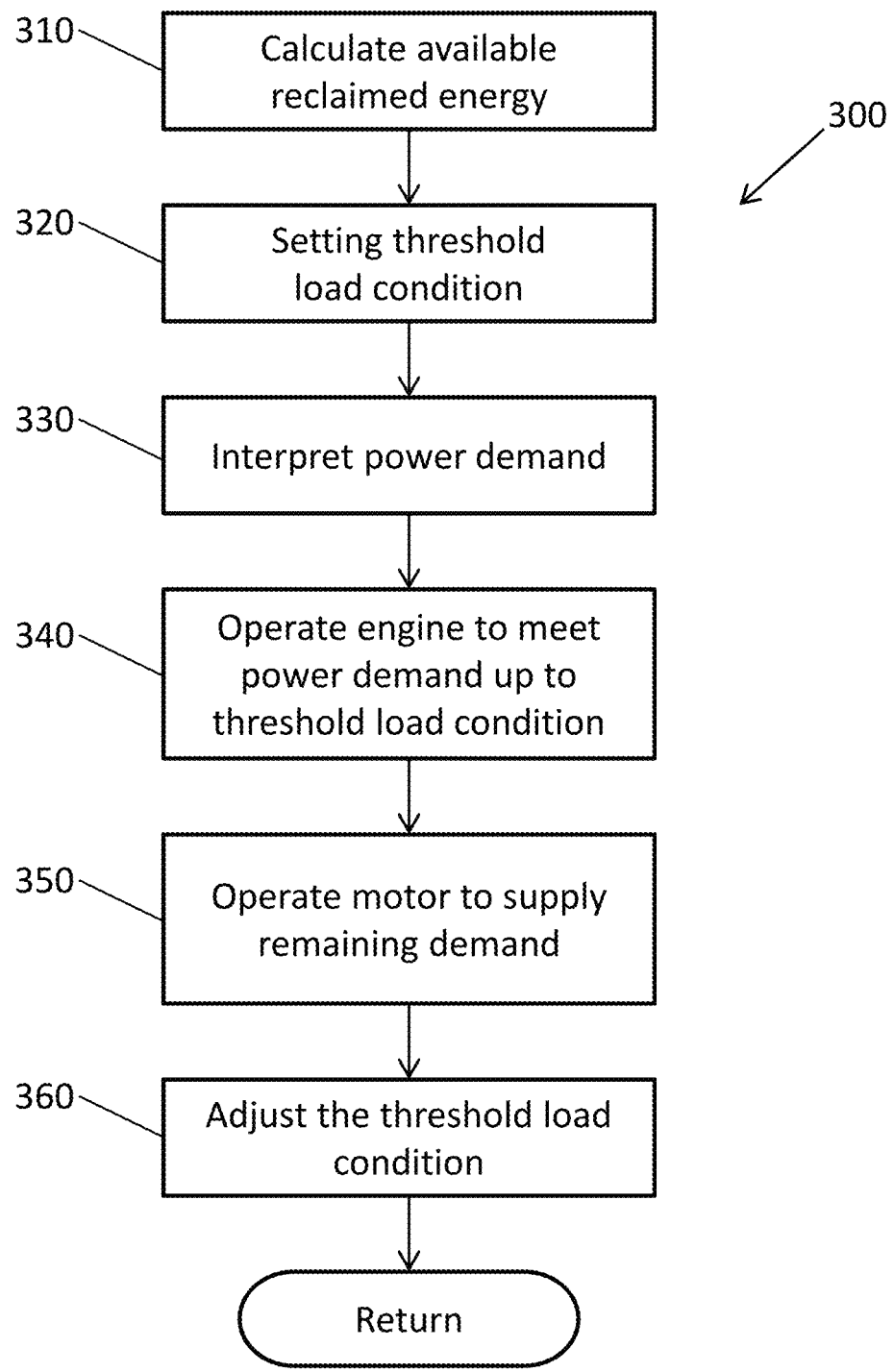
FIG. 4 is a schematic flow diagram of a method for controlling a power split in a hybrid powertrain according to the present disclosure.

As shown in FIG. 4, an alternative method 300 of determining a desired power split between power sources of the hybrid powertrain 100 includes an operation 310 of calculating a quantity of available reclaimed energy in the battery 110 of the hybrid powertrain 100 over an estimated duty cycle of the powertrain 100. The method 300 may include an operation 320 of setting a threshold load condition. The method 300 may further include an operation 330 of interpreting the power demand for the powertrain 100 from the demand input device 112, and an operation 340 of operating the engine 102 to supply the power required to meet the power demand up to the established threshold load condition. The method 300 may further include an operation 350 of operating the motor 104 to provide the remaining power demand not met by the engine-contributed power from engine 102 when the battery 110 has available reclaimed energy stored therein. The method 300 may further include an operation 360 of adjusting the threshold load condition as needed to maintain available reclaimed energy in the battery 110. The operation 360 may include adjusting the threshold load condition when the charge state of the battery 110 approaches the prescribed lower limit.

Figure 5:
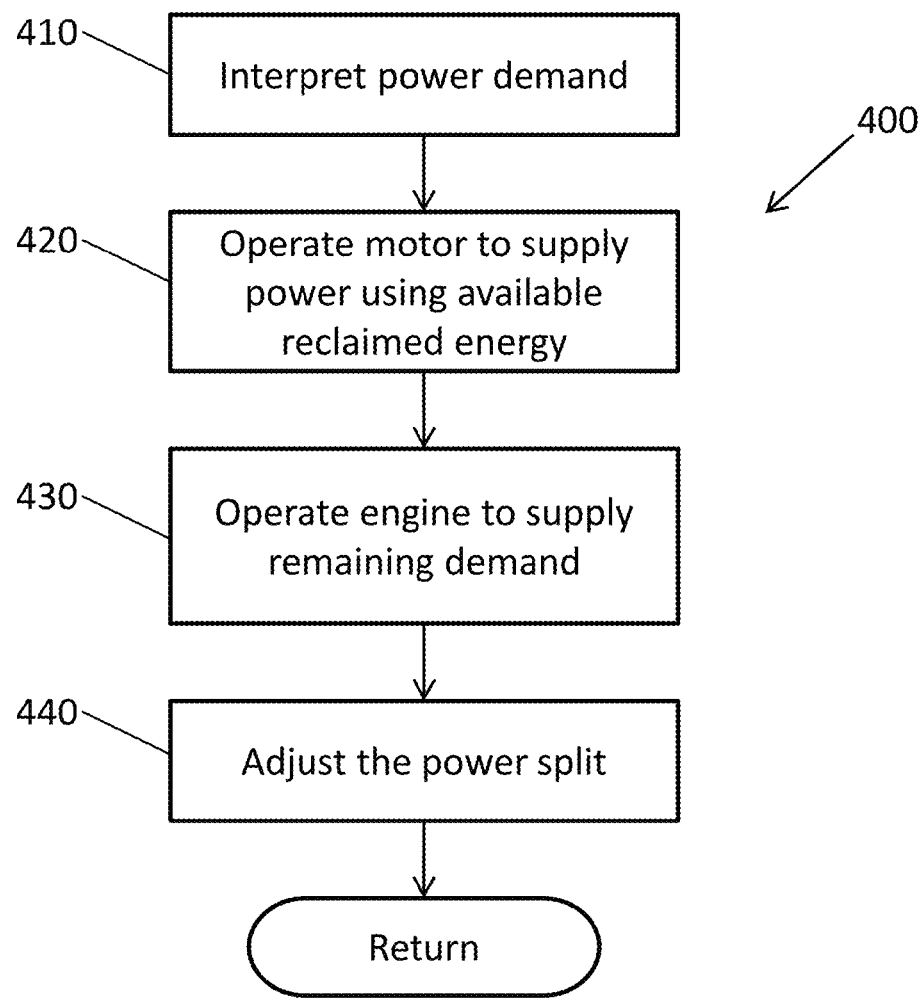
FIG. 5 is a schematic flow diagram of a method for controlling a power split in a hybrid powertrain according to the present disclosure.

As shown in FIG. 5, a further alternative method 400 of determining a desired power split between power sources of the hybrid powertrain 100 includes an operation 410 of interpreting the power demand for the powertrain 100 from the demand input device 112. The method 400 may further include an operation 420 of operating the motor 104 to supply as much power as possible given the available reclaimed energy stored in the battery 110, and an operation 430 of operating the engine 102 to supply engine-contributed power as needed to meet the power demand not met by the motor 104. Moreover, the method 400 may include an operation 440 of adjusting the commanded power split between the engine 102 and the motor 104 when the charge state of the battery 110 approaches the prescribed lower limit.

Figure 6:
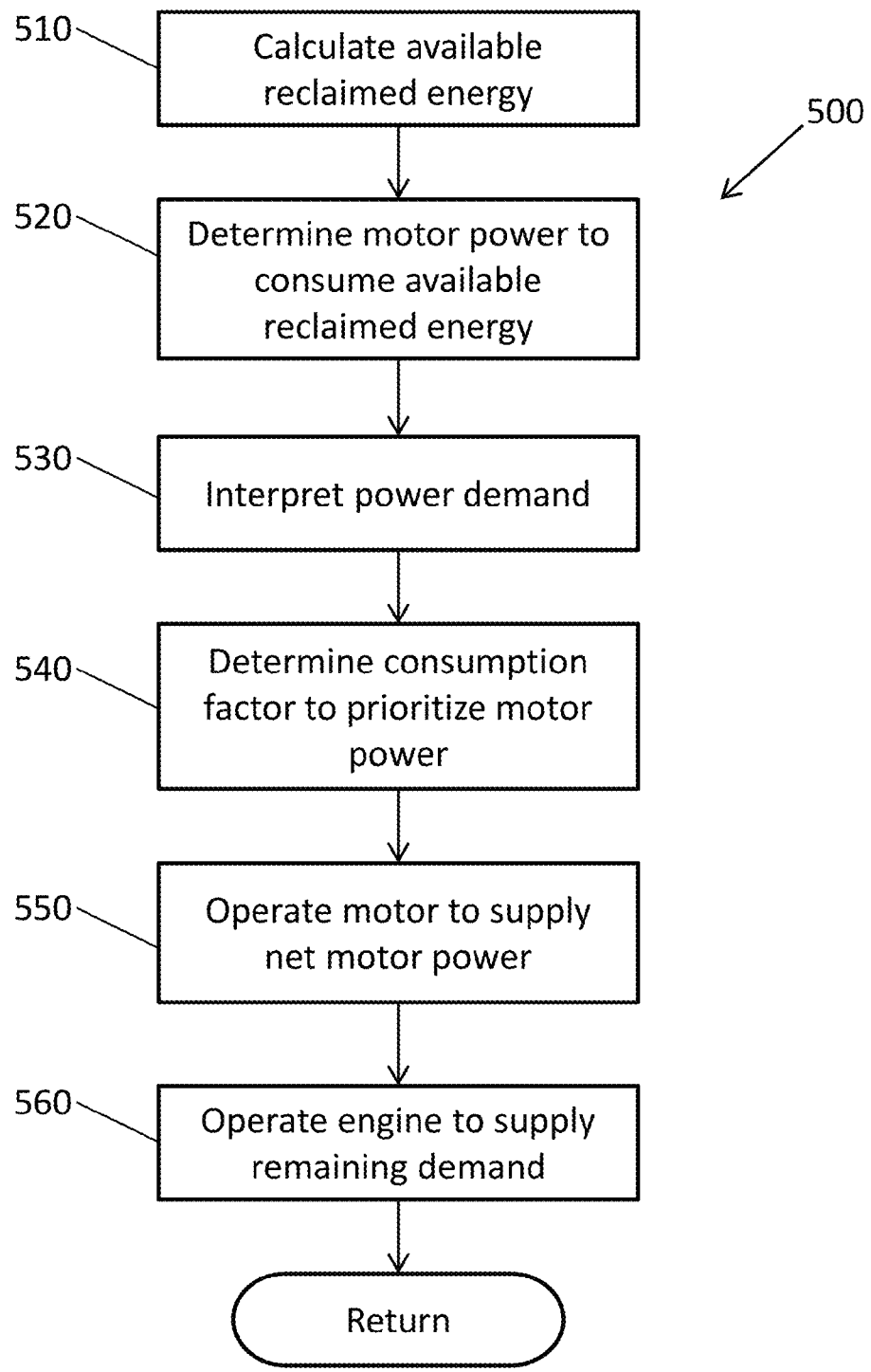
FIG. 6 is a schematic flow diagram of a method for controlling a power split in a hybrid powertrain according to the present disclosure.

As shown in FIG. 6, a further alternative method 500 of determining a desired power split between power sources of the hybrid powertrain 100 includes an operation 510 of calculating a quantity of available reclaimed energy in the battery 110 of the hybrid powertrain 100. The method 500 may include an operation 520 of determining a desired motor-contributed power from the motor 104 that would consume the available reclaimed energy in the battery 110 to a target level at a minimum rate necessary to ensure adequate storage capacity in the battery 110 for future regeneration events. In such an embodiment, the minimum rate of depletion may be determined at least in part based on the estimated duty cycle of the powertrain 100, and the target level may be determined based on characteristics of the battery 110, including the charge capacity. The method 500 may further include an operation 530 of interpreting the power demand for the powertrain 100 from the demand input device 112. The method 500 may further include an operation 540 of determining a battery consumption factor and applying the battery consumption factor to the motor-contributed power from the motor 104 as determined in the operation 520. Further, the method 500 may include an operation 550 of operating the motor 104 to provide a net motor-contributed power from the motor 104. The net motor-contributed power includes the motor-contributed power from the motor 104 as determined from the operation 520 and as increased by the battery consumption factor determined from the operation 540. The battery consumption factor may vary in proportion to the total demand on the powertrain 100 and other operating conditions. For example, the battery consumption factor may vary in proportion to the marginal displace fuel consumption of the powertrain 100. The method 500 may further include an operation 560 of operating the engine 102 to generate and provide the remaining power demand not met by the motor-contributed power from the motor 104.

As is evident from the figure and text presented above, a variety of embodiments according to the present disclosure are contemplated. Such system embodiments may be employed in a variety of methods, processes, procedures, steps, and operations as a means of controlling the power split in a hybrid powertrain having an engine and a motor. While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

The invention claimed is:

1. A method comprising:
    calculating a quantity of available reclaimed energy in a battery, the battery structured to power an electric motor, the motor connected to an internal combustion engine via a power splitter, wherein the battery, motor, engine, and power splitter comprise a hybrid powertrain structured to output power to meet a power demand;
    selecting a marginal displaced fuel consumption value for the engine based on incremental changes in the power contributions of the engine and the motor that is constrained by the quantity of available reclaimed energy in the battery, wherein the marginal displaced fuel consumption value is selected based on a desired marginal displaced fuel consumption contour line defining a region of displaced fuel consumption for the engine from an engine operating efficiency map in which losses shared with the motor are removed;
    interpreting the power demand from a demand input device in communication with the powertrain;
    operating the engine at a speed and load condition based on the marginal displaced fuel consumption value to generate engine power to meet at least a portion of the power demand;
    operating the motor to generate motor power sufficient to supply a remaining power demand not met by the engine power; and
    adjusting the engine power and/or the motor power in response to changes in power demand and/or available reclaimed energy.

2. The method of claim 1, wherein the marginal displaced fuel consumption value is selected to enable the battery to supply electrical power to the motor over an estimated duty cycle, such that a charge state of the battery does not drop below a prescribed lower limit nor rise above a prescribed upper limit.

3. The method of claim 1, wherein the quantity of available reclaimed energy is calculated from an estimated duty cycle, the estimated duty cycle including regeneration events.

4. The method of claim 1, wherein the quantity of available reclaimed energy is calculated from empirical data of operation of the powertrain, whereby the available reclaimed energy is adjusted during operation of the powertrain.

5. The method of claim 1, wherein the motor power is limited by the quantity of available reclaimed energy in the battery.

6. The method of claim 5, wherein the battery has a charge capacity and a charge level, and wherein the quantity of available reclaimed energy is limited such that the charge level of the battery is not less than a prescribed lower limit.

7. The method of claim 1, wherein the marginal displaced fuel consumption value is selected from a reference table including at least a portion of the operating range of the engine.

8. A method of controlling a hybrid powertrain, the method comprising:
    determining a quantity of regeneration energy in a battery, the battery structured to power an electric motor, the motor connected to an internal combustion engine via a power splitter, wherein the battery, motor, engine, and power splitter comprise a hybrid powertrain structured to power a load;
    determining a marginal displaced fuel consumption value for the hybrid powertrain based on incremental changes in the power contributions of the engine and the motor that is constrained by the quantity of regeneration energy, wherein the marginal displaced fuel consumption value is selected based on a desired marginal displaced fuel consumption contour line defining a region of displaced fuel consumption engine from an engine operating efficiency map in which losses shared with the motor are removed;
    selecting a threshold load condition for the engine that is based on the marginal displaced fuel consumption and the quantity of regeneration energy in the battery;
    interpreting a power demand from a demand input device in communication with the powertrain;

operating the engine to generate engine power sufficient to meet the power demand not in excess of the threshold load condition;

operating the motor to generate motor power sufficient to supply the remaining power demand not met by the engine power; and adjusting the engine power and the motor power in response to changes in power demand and/or regeneration energy.

9. The method of claim 8, wherein the threshold load condition favors the use of the regeneration energy at relatively high load power demand conditions, such that a charge state of the battery does not drop below a prescribed lower limit nor rise above a prescribed upper limit.

10. The method of claim 8, wherein the threshold load condition favors the use of engine power at relatively low load power demand conditions, such that a charge state of the battery does not drop below a prescribed lower limit nor rise above a prescribed upper limit.

11. The method of claim 8, wherein the threshold load condition is selected to maintain sufficient regeneration energy in the battery over an estimated duty cycle to enable the motor to meet the portion of the power demand above the threshold load condition not met by the engine power, such that a charge state of the battery does not drop below a prescribed lower limit nor rise above a prescribed upper limit.

12. The method of claim 8, wherein the quantity of regeneration energy is calculated from empirical data of operation of the powertrain.

13. The method of claim 8, wherein the quantity of regeneration energy is determined from an estimated duty cycle of the powertrain, the estimated duty cycle including regeneration events.

14. A method of controlling a hybrid powertrain, the method comprising:

determining a quantity of regeneration energy in a battery having a capacity, the battery structured to power an electric motor, the motor connected to an internal combustion engine via a power splitter, wherein the battery, motor, engine, and power splitter comprise a hybrid powertrain structured to power a load;

determining a marginal displaced fuel consumption value for the hybrid powertrain based on incremental changes in the power contributions of the engine and the motor that is constrained by the quantity of regeneration energy, wherein the marginal displaced fuel consumption value is selected based on a desired marginal displaced fuel consumption contour line defining a region of displaced fuel consumption for the engine from an engine operating efficiency map in which losses shared with the motor are removed;

interpreting a power demand from a demand input device in communication with the powertrain;

operating the motor to generate motor power based on the marginal displaced fuel consumption value that is sufficient to consume the quantity of regeneration energy at a rate, the rate selected to make available capacity in the battery for storage of additional regeneration energy;

operating the engine to generate engine power sufficient to supply the remaining power demand not met by the motor power; and adjusting the engine power and the motor power in response to changes in power demand and/or regeneration energy.

15. The method of claim 14, wherein the method further comprises:

determining a consumption factor, the consumption factor proportional to the marginal displaced fuel consumption of the powertrain; and increasing the motor power by the consumption factor.

16. The method of claim 14, wherein the quantity of regeneration energy is determined from an estimated duty cycle of the powertrain, the estimated duty cycle including the powertrain regeneration events.

17. The method of claim 15, wherein the consumption factor favors the use of the quantity of regeneration energy at relatively high load conditions, such that a charge state of the battery does not drop below a prescribed lower limit nor rise above a prescribed upper limit.

18. A system for controlling a hybrid powertrain, the system comprising:

a hybrid powertrain, the powertrain comprising:
on internal combustion engine structured to generate engine power,
an electrical motor, the motor structured to generate motor power and to selectively generate electrical power, the motor connected to the engine via a power splitter, and
a battery, the battery connected to the motor and structured to store regeneration energy; and a controller in communication with the powertrain and structured to operate upon a torque or power demand to determine a power split between the engine and the motor, wherein the controller is configured to determine a marginal displaced fuel consumption value for the engine based on incremental changes in the power contributions of the engine and the motor that is constrained by a quantity of reclaimed energy in the battery, wherein the marginal displaced fuel consumption value is selected based on a desired marginal displaced fuel consumption contour line defining region of displaced fuel consumption for the engine from an engine operating efficiency map in which losses shared with the motor are removed, wherein the marginal displaced fuel consumption value favors using the quantity of available reclaimed energy at relatively high load conditions, to operate the engine at a speed and torque condition based on the marginal displaced fuel consumption value to meet at least a portion of the torque or power demand, and to operate the motor to generate sufficient motor power to supply a remaining torque or power demand not met by the engine power.

19. The system of claim 18, wherein the controller is further configured to adjust the engine power and/or the motor power in response to changes in the torque or power demand and the regeneration energy.

20. The system of claim 18, wherein the engine and the motor are arranged in a parallel configuration.

* * * * *